SHIP'S HULL CONSTRUCTION

Original Filed Aug. 12, 1964 6 Sheets-Sheet 1

United States Patent Office

Re. 26,997
Reissued Dec. 8, 1970

26,997

SHIP'S HULL CONSTRUCTION

Ernst Eckert, Grosshansdorf, Germany, assignor to Esso Research and Engineering Company, a corporation of Delaware Original No. 3,302,603, dated Feb. 7, 1967, Ser. No. 389,157, Aug. 12, 1964. Application for reissue Dec. 17, 1968, Ser. No. 793,206

Int. Cl. B63b *1/04*

U.S. Cl. 114—56 10 Claims

Matter enclosed in heavy brackets [ ] appears in the original patent but forms no part of this reissue specification; matter printed in italics indicates the additions made by reissue.

*ABSTRACT OF THE DISCLOSURE*

*A hull construction for a cargo vessel having a block coefficient of at least 0.75 and a Froude number of less than 0.25 which includes a protruding bulbous bow. The size of the bulbous bow is determined in accordance with a formula which establishes a preferred ratio between bulb length forward of the forward prependicular and maximum beam of the bulb at the forward perpendicular and a preferred ratio (i.e. C valve) between the volume of the bulb relative to the volume of a specified portion of the forebody of the vessel.*

The present invention relates to improvements in ship's hull construction and relates more particularly to relatively slow, bulky ships such as oil tankships.

A limiting factor of a ship's speed or economy is the resistance to motion caused by friction and by the waves resulting from its hull design. It is known that a property placed submerged sphere can create a wave form which is roughly the reverse of that created by the ship. Hence the development since the early years of this century of the so-called "bulbous bow." In this the lower part of the bow or stem of the ship is enlarged into a bulbous form which has a counteracting effect on the bow-wave which would be formed in its absence.

The fundamental principles of the bulbous bow are well set out in a paper entitled "The Theory of the Bulbous Bow and its Practical Application" by W. C. S. Wigley (Trans. N.E. Coast Inst. Engineers and Shipbuilders, 1935–6, LII, pp. 65–88). The author's own conclusions are summarised below.

(1) The useful speed range of a bulb in knots is generally from $0.8\sqrt{L_s}$ to $1.9\sqrt{L_s}$ where $L_s$=ship length in feet between perpendiculars.

(2) The worse the wave making of the hull itself the greater the expected gain from the bulb and vice versa.

(3) Unless the lines are extremely hollow the best position for the bulb is with its centre at the bow i.e. with its nose projecting forward of the hull.

(4) The bulb should extend as low as possible consonant with hull lines.

(5) The bulb should be as short longitudinally and wide laterally as possible consonant with hull lines.

(6) The top of the bulb should not approach too nearly the water surface (the immersion of the highest part of bulb should not be less than its own total thickness).

His first conclusion is that bulbs are useful with ships at Froude figures ($V/\sqrt{L_s}$) of 0.8 to 1.9, which in practice means relatively fast ships having fine lines and low Block Coefficients. The fourth, fifth and sixth indicate that the bulb should be as low as possible in the water and that its top should at all times be substantially below water level. In practice this virtually limits the applicability of the bulb to ships which sail in more or less constant draft such as passenger liners and warships, since to apply these principles to load-carrying vessels in which the ballast waterline (BWL) is substantially below the laden waterline (LWL) would present major problems of design.

For the purpose of describing the present invention, bulbous bows may conveniently be divided into two classes, namely protruding and receding. Protruding bows conform to Wigley's third principle and form a bulge or bulbous protrusion extending forward of the forward perpendicular of the hull. Receding bows on the other hand take the form of a bulge or swelling in the sides of the hull aft of the forward perpendicular.

It has now been discovered that the provision of a protruding bulbous bow on a load-carrying vessel having a substantial difference between is BWL and LWL, in such a way that a substantial part of the bulb lies above the BWL, gives highly unexpected and beneficial results when the ship is sailing in ballast. Significant gains in economy and/or speed are achieved together with some gain in stability, and this in spite of the fact that with the bulb partly out of the water the ship's forward profile at the BWL is the blunt profile of the bulb rather than the traditional sharp bow profile.

Not only is this quite unexpected in relation to the principle that the bulb should always be well submerged, but it will also be observed that the gain is obtained on ships at much lower Froude figures than have hitherto been contemplated.

The most characteristic of the load-carrying ships of the present invention is the substantial difference between BWL andw LWL already referred to. Thus with oil-tankers, which form the preferred embodiment of the invention, the displacement in ballast may amount to only 50–60% of that when fully laden. The displacement in ballast may range from as little as 45% to as much as 80% of that when fully laden. A further distinguishing feature is the Froude figure which will normally be in the range of 0.5 to 0.8 as contrasted with the range of 0.8 to 1.9 indicated by Wigley. A further characteristic is a high Block Coefficient ($C_b$) which in effect is a measure of the extent to which the shape of the ship approximates to a long rectangular box. It is given by the formula $$\frac{35\Delta}{L_3 \times B \times d}$$

where:

$\Delta$=Displacement in tons
$L_s$=Length between perpendiculars
B=Beam amidships
d=Draft The $C_b$ of a load carrying ship of the type referred to will normally be at least 0.75, whereas for finer ships such as the passenger ship and warships already referred to it will rarely exceed 0.7.

Thus broadly the present invention comprises a load carrying ship's hull provided with a protruding bulbous bow of which a substantial proportion lies above the ballast waterline, the nose of the bulb being located below the ballast waterline.

The Load Waterline of the ship is fixed in its design. The Ballast Waterline, however, may vary according to weather conditions, individual preferences, etc. It will normally be as low as practicable in order to reduce drag and accordingly economise in fuel. Considering the draft waterlines from 0% at keel level to 100% at load level, a normal range of ballast waterlines for tankships and similar craft will be from 50% to 60%. A BWL of 45% would be regarded as low, while one of 80% would be uneconomically large and justified only by special conditions.

On this basis one can meet the requirement that the nose of the bulb should be below the BWL by saying that it should be below the 45% waterline and preferably below the 40% waterline. At the same time it should not be too low and preferably should lie in the region of the 35% waterline, preferably between the 30% and 40% waterlines.

The requirement that a substantial part of the bulb should lie above the ballast waterline is less easy to define precisely due to the variable nature of the BWL. Common sense however simplifies this problem. A substantial amount of the bulb must always lie above the 45% waterline, and for all practical purposes above the 50% waterline also. As already stated the normal BWL range for tankships etc. is 50% to 60% and a bulb installed in accordance with the present invention should have a substantial part above the 60% waterline.

The bulb may be faired in at the 80% waterline or thereabouts or at or even above the fully laden load waterline. When the bulb is faired in above the LWL it forms a new pseudo forward perpendicular. Under these conditions a small but significant portion of the bulb may be visible even when the ship is fully laden.

The invention will now be described more fully with reference to the accompanying drawings, in which.

Figure 1A:
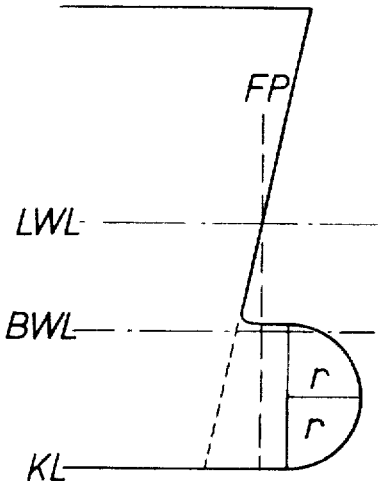
FIGURES 1a and 1b represent diagrammatical longitudinal vertical midsections of the fore end of a ship incorporating the simplest embodimetn of a bulbous bow.
Figure 1B:
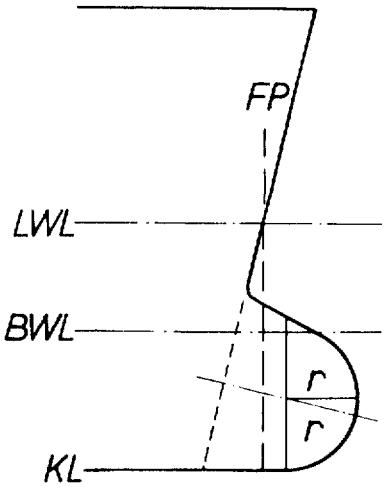

Referring now to FIGURES 1a and 1b, two of the simplest possible embodiments of a bulbous bow are illustrated. These consist of a hemisphere of radius "r" faired onto the hull by a mounting which is shown as roughly cylindrical in FIGURE 1a and roughly conical in FIGURE 1b. Such a bow would have a waterline profile consisting of a semicircle constituting the bulb and two parallel or inclined straight lines constituting the fairings. The transverse vertical profile would obviously be circular in the first case and elliptical in the second.

In a preferred embodiment of the present invention the waterline profiles of the bulb are hydrodynamically designed for low resistance, e.g. a Joukowsky profile or a Göttinger profile. Only the forward portion of the profile is used, and from its point of maximum beam, fairings of gradually increasing beam extend smoothly back into the hull.

Figure 2A:
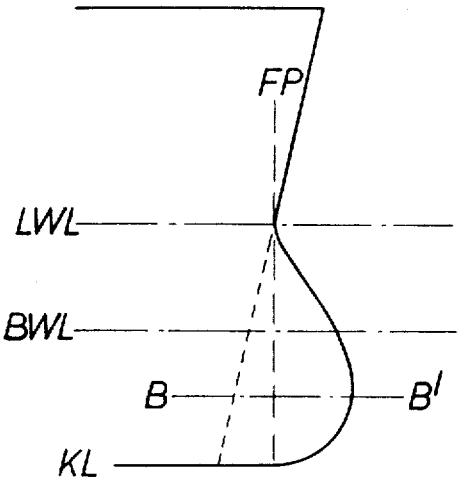
FIGURES 2a, 2b and 2c represent longitudinal and transverse vertical sections and a horizontal section, respectively, of the fore end of a ship illustrating certain preferred features of the present invention.
Figure 2B:
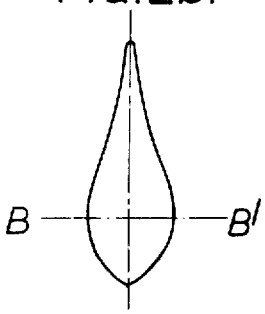
Figure 2C:
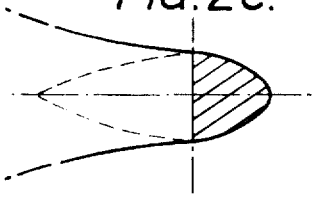

This is illustrated in FIGURES 2a, 2b and 2c. FIGURE 2a shows a longitudinal vertical mid-section of a portion of the bows of the ship and illustrates how the bulbous portion of the bow should project in front of the forward perpendicular with its maximum beam B—B' below the BWL and faired into the normal bows at or about the LWL. This bulbous bow is in the shape of part of Joukowsky profile having its point of maximum beam at the FP and thence faired into the hull by slightly concave fairings. FIGURE 2b illustrates the transverse vertical section through the FP and FIGURE 2c illustrates the horizontal section or waterline through the line B—B'. In FIGURE 2c the vertical dotted line represents the FP. The shape of the bow ahead of the FP is seen to coincide with part of a Joukowsky profile (the remainder of which is represented by the curved discontinuous line). Aft of the FP the bulb is faired to the hull and departs from the Joukowsky profile. It may be stated here that in all cases it is preferred that the point of maximum beam of the bulb (i.e. the hemisphere or Joukowsky or other profile) should lie at or slightly forward of the forward perpendicular. The beam of the bow aft of this pooint will, in fact, steadily increase but, as may be seen from FIGURE 2c, this increase is in the beam of the fairings and not in the streamlined profile itself.

The other waterline sections parallel to that at B—B', which is the section of maximum length, will be of generally similar configuration, although noticeably sharper near the LWL, where, as may be seen from the beam or transverse section at the FP (FIG. 2b) the beam of the bulb narrows rapidly.

Thus, at the FP the beam section is substantially pear-shaped or like a teardrop, while parallel beam sections forward become more and more ovate in shape. This is illustrated further in FIGURE 6 and in FIGURE 8.

Figure 3:
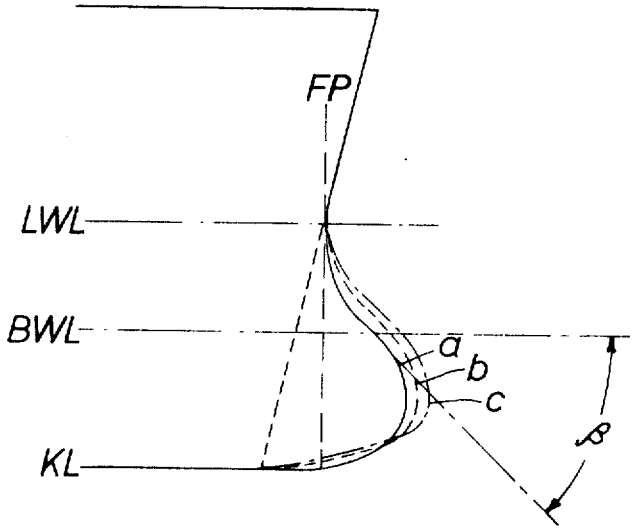
FIGURE 3 represents a similar longitudinal vertical section illustrating alternative sections of bulbous bows fitted in accordance with the present invention.

To provide a bulb of given volume obviously permits a wide variety of different shapes ranging from the blunt or snub-nosed projecting only a short distance forward to the long and thin projecting far forward. As a generalisation the blunt form is preferred, and in accordance with this it is also preferred that the fairings of the upper part of the bulb should enter the hull at or slightly below the LWL. This is shown in FIGURE 3 in which three alternative longitudinal mid-sections of roughly equivalent area are shown. It will be seen that the profile of these sections from the LWL to the nose of the bulb is initially concave and then changes to convex. It is desirable that the angle of entrance of the bulb at the waterline should always be reasonably large (that is the angle between the waterline and the tangent to the profile at the point where it is intersected by the waterline), of the order of more than 30° and preferably 40° or so, and this carries a preference for the blunter bulbs with relatively little inflection in the upper profile, and the blunt form a in FIGURE 3 is preferable to the sharper forms b and c with their more marked inflections. As shown in FIG. 3 thereon, angle $\beta$ represents the angle between the waterline (at any level between the designed Load Waterline and the Ballast Waterline) and the tangent to the longitudinal midsection of the bulb where it is cut by the waterline, angle $\beta$ being in the preferred embodiment, never less than 40°.

Considering now the size rather than the shape of the bulb, the following relationship has been derived as a means of establishing bulb dimensions for a given hull structure:

$$\frac{l \times b^2}{B_s \times \frac{L_s}{20} \times \frac{d}{2}} = \text{Constant (C)}$$

where:

b=Maximum beam of bulb at forward perpendicular
l=Length of bulb forward of forward perpendicular
$B_s$=Beam of vessel at $L_s/20$ at LWL
$L_s$=Length of ship between perpendiculars
d=Maximal draft of vessel While the value of the constant C in this relationship can vary from as little as 0.03 to as much as 0.3, one would not normally go outside the limits of 0.05 to 0.2. A preferred range is 0.07 to 0.18 with an optimum of 0.09 to 0.13.

This formula gives an interrelationship between l and b and in practice it is necessary to known permissible and preferred ratios of l to b. The length of the bulb is of course the distance from its nose to the forward perpendicular, and as illustrated in FIGURE 3 practical consideartion rule out excessive length. Values of from 1.5% to 2.1% of the ship's length are acceptable. An 1/b range of from 0.5 to 2.5 may be taken as possible but values above 1.5 become increasingly unattractive and the preferred range is from 1.0 to 1.1.

As already mentioned, a substantial, though minor, part of the bulb should be above the BWL, and the nose should be below the BWL, and these factors also are important in determining the shape and location of the bulb. For load-carrying ships of the type described in which the BWL will normally lie within the 50% to 60% displacement waterlines, the most forward part or nose of the bulb can conveniently be located within 30% to 40% displacement waterlines, which, in practice, is more or less equivalent to saying that the height of the nose of the bulb over the keel line is about 30% to 40% of the maximum draft of the ship. This provides that the nose of the bulb is always submerged (except when the ship is pitching violently) and that a substantial proportion of the bulb is above the BWL.

Figure 4:
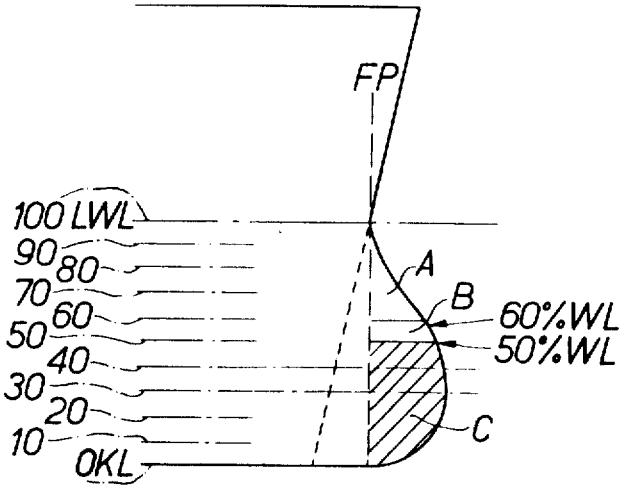
FIGURE 4 is a similar longitudinal vertical section which illustrates the way in which a substantial portion of the bulb lies above the ballast waterline.

The volume of the bulb above the BWL, and which is thus exposed when the ship is in ballast may vary considerably according to the waterline and vertical profiles selected and it is more convenient and fully satisfactory to consider the area of a longitudinal midsection of the bulb forward of the FP. FIGURE 4 shows a typical example. Displacement waterlines are shown at 10% intervals and it can be seen that the nose of the bulb lies midway between the 30% and 40% waterlines. Considering the 60% waterline as the BWL the exposed area is A and represents about one-sixth of the total area A+B+C. The corresponding value with a 50% BWL is about one-third.

Figure 5:
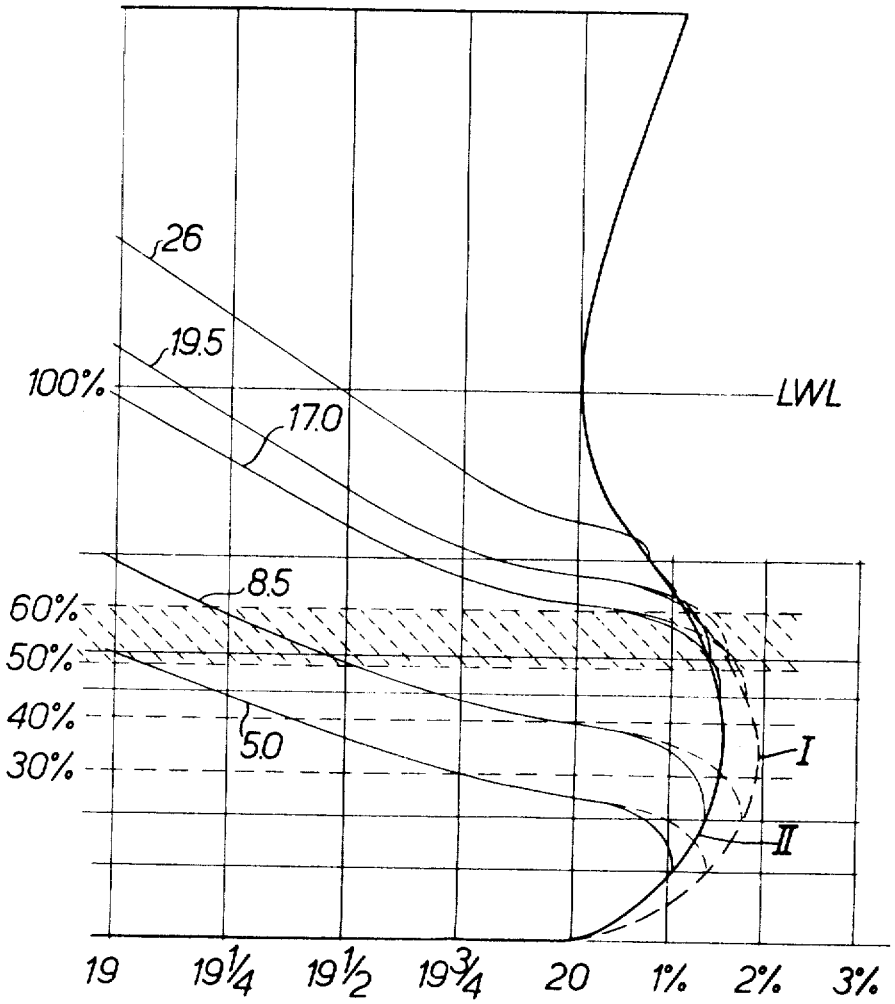
FIGURES 5 and 6 are conventional naval architectural drawings of two specific bulb designs.
Figure 6:
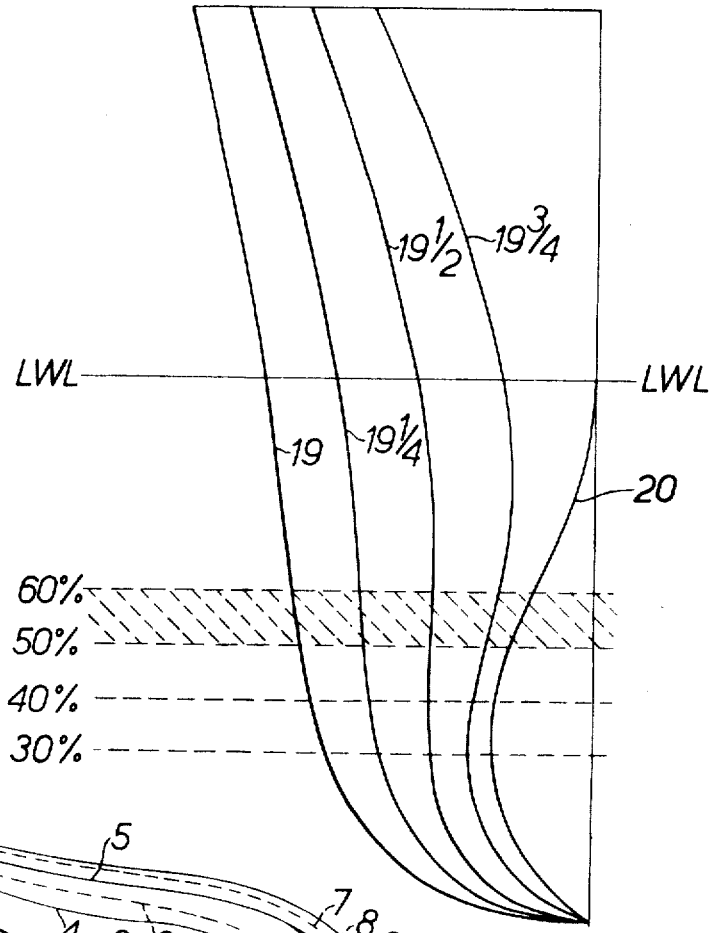

FIGURES 5 and 6 show conventional naval architectural drawings of two specific embodiments of an improved bulbous bow as applied to an oil tanker. FIGURE 5 is the longitudinal midsection and FIGURE 6 is a conventional representation of the bow profiles at various stations. Only the 19th to 20th stations of the ship are shown, subdivided into quarters. The 1st to 19th stations are conventional. In FIGURE 6, the beam sections through these stations are shown centered on the midsection thus giving a perspective impression of the front view of the ship. In FIGURE 5 the waterline curves should be visualized as rotated 90° out of the plane of the paper into the planes of the actual waterlines.

The waterlines shown on FIGURE 5 have been chosen so as to give a visual impression of the general lay-off and appearance of the bulbs I and II. Stations 1 to 19 inclusive are unchanged from the conventional hull form without bulbous bow. The bulging fairings running aft from the FP are visible in stations 19¾ and 20. The 30% to 40% and 50% to 60% waterline bands are indicated and it will be seen that the noses of both bulbs lie at about the 35% waterline and that a substantial amount of the bulb is exposed above the Ballast Waterline assuming it to lie in the 50% to 60% band. Vertical ordinates showing 1%, 2% and 3% of the ship's length forward of FP are also shown in FIGURE 5 and it will be seen that the noses of both bulbs lie between the 1% and 2% ordinates.

Figure 7:
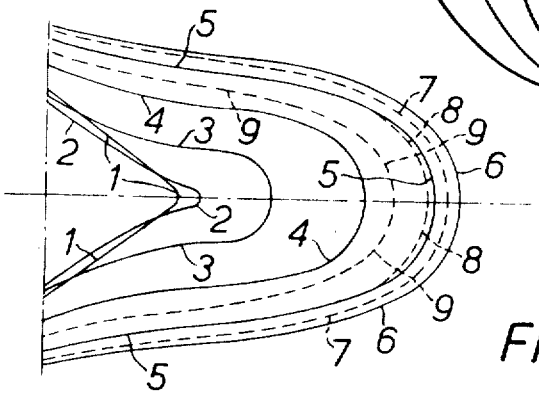
FIGURES 7, 8 and 9 illustrate a third specific bulb design in the form of contour diagrams showing horizontal and transverse vertical sections and a longitudinal vertical mid section, respectively, through the bulb.
Figure 8:
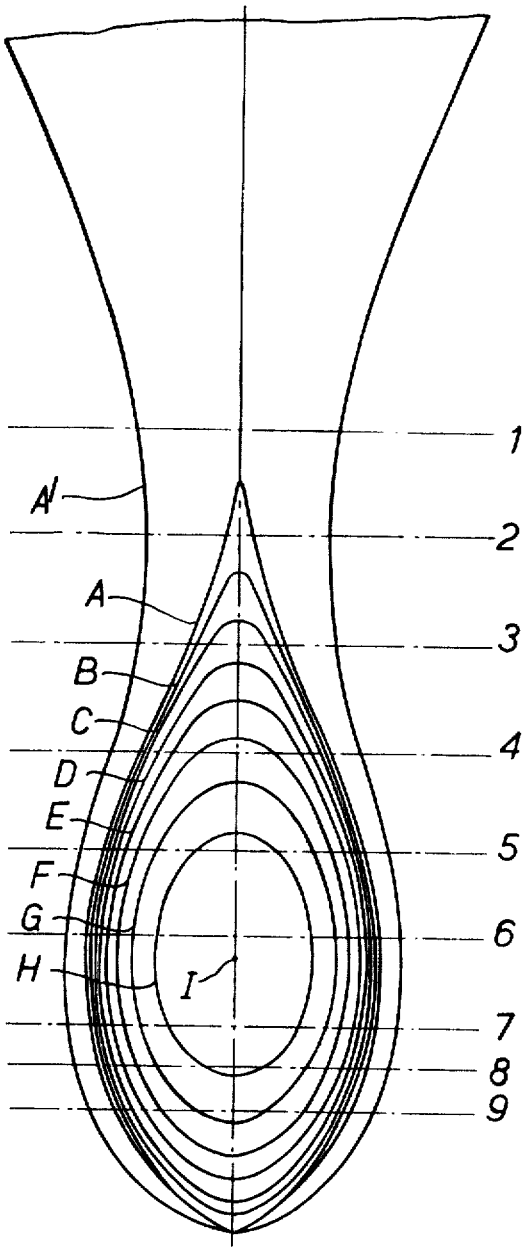
Figure 9:
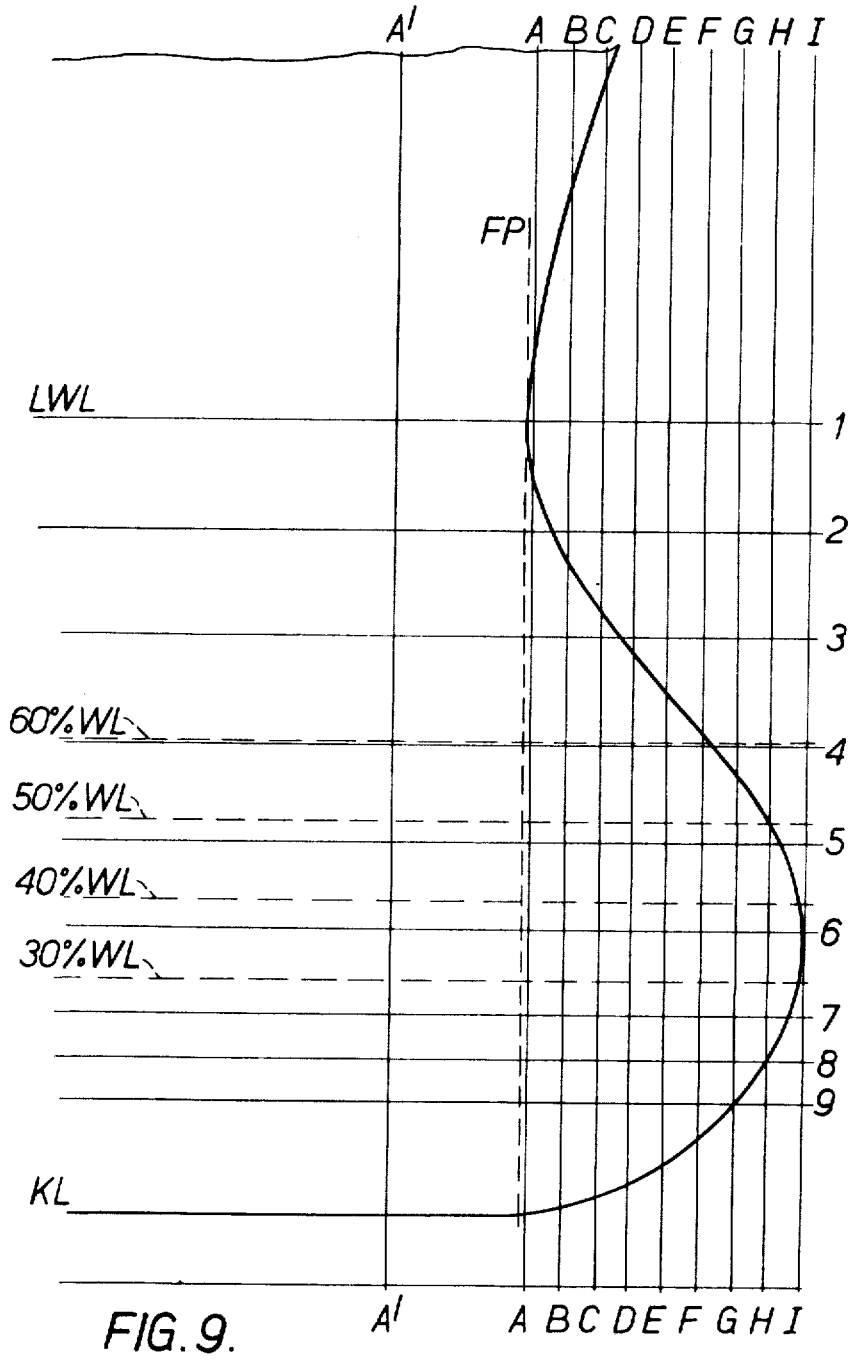

FIGURE 7 shows a specific bulb design using a different graphical presentation. In this, transverse horizontal sections of the bulb from the FP forward are shown as a contour diagram. FIGURES 8 and 9 show a contour diagram of transverse vertical sections and a longitudinal midsection, respectively, of a preferred bulb. Sections A, B, C, D, E, F, G and H are progressive transverse vertical sections up to the nose of the bow, I, which this case lies between the 30% to 40% waterlines.

This presentation gives a clear impression of the progressive bluntening of the bulb as it extends forward. The waterline entry at LWL is very narrow but widens rapidly down the forward slope of the bulb to the nose. Similarly the part of the transverse vertical section at the FP adjacent to the keel is seen to be in the form of a blunt wedge, the corresponding parts of the more forward sections becoming increasingly rounded until the sections adjacent the nose itself are virtually oval.

As already indicated, the normal application of protruding bulbous bows is to fine fast passenger ships which operate at more or less constant draft. The present invention provides a protruding bulbous bow to a cargo ship of high block coefficient, in such a way as to improve the ship's performance when in ballast.

Model tests on a simulated 48,000 DWT tanker with a bulbous bow as illustrated in FIGURE 5 showed an overall improvement in speed in the region of 0.8 knot in the speed range of 15 to 17.5 knots at a 55% Ballast Waterline with an even greater speed improvement at lower Ballast Waterlines. Smaller but significant improvements were obtained in the more fully laden condition. An additional gratuitous advantage is gained in the shifting forward of the centre of buoyancy.

On a 36,000 DWT tanker model the speed advantage at 55% Ballast Waterline was about 0.8 knot for the 15 to 17.5 knots speed range.

Similar model tests were conducted with a 26,000 DWT, 65,000 DWT, 90,000 DWT and elongated 36,000 DWT vessels. The speed gain in these tests averaged about 4.5% at 60% ballast level. At 45% ballast level the speed gains averaged between 6.5% and 7%.

What is claimed is:

1. In a ship's hull constructed as a full form cargo carrier vessel having a block coefficient of at least 0.75 and a designed Froude number of less than 0.25 and operating throughout a wide range of load or ballast conditions wherein the ballast waterlines (BWL) are between 45% and 80% of the load waterline (LWL), the improvement comprising a protruding bulb portion of the bow of said vessel having a length (l) ahead of the forward perpendicular of said vessel, wherein the vessel length is (L) and a ratio of said length (l) over the maximum beam (b) of the bulb portion at the forward perpendicular of the vessel is in the range of about 0.5 to 2.5, and in which the measurements of said bulb portion comply with the equation $$\frac{l \times b^2}{B_S \times \frac{L_S}{20} \times \frac{d}{2}} = \text{Constant (C)}$$

wherein the value of C is between 0.05 and [0.20] *0.30*.

2. A ship's hull according to claim 1 in which the maximum beam of the profile of said bulb is at or forward of the forward perpendicular of the hull and fairings extend smoothly from this point of maximum beam aft into the ship's hull.

3. A ship's hull according to claim 2 in which the upper part of said bulb is faired into the hull at or slightly below the Load Waterline.

4. A ship's hull according to claim 1 in which the transverse section of said bulb at the forward perpendicular is substantially in the shape of a tear or drop, the forward sections becoming increasingly ovate as they approach the nose of the bulb.

5. A ship's hull according to claim 4 in which the lowest part of the transverse vertical section of said bulb at the forward perpendicular is in the form of a blunt wedge where it contacts the keel line, the more forward sections becoming increasingly ovate as they approach the nose of the bulb.

6. A ship's hull according to claim 5 in which the longitudinal midsection of said bulb is such that the angle between the waterline (at any level between the designed Load Waterline and the Ballast Waterline) and the tangent to the midsection at the point where it is cut by the waterline is never less than 40°.

7. A ship's hull according to claim 1 in which the value of C is between 0.07 and 0.18, and preferably between 0.09 and 0.13.

8. A ship's hull according to claim 1 in which its Ballast Waterline lies between the 50% and 60% displacement waterlines, and the nose of said bulb lies below the 40% displacement waterline.

9. A ship's hull according to claim 1 in which the area of the longitudinal midsection of said bulb forward of the forward perpendicular and above the Ballast Waterline is from one-sixth to one-third of the total area of the said midsection.

10. In a ship's hull constructed as a full form cargo carrier vessel having a block coefficient of at least 0.75 and a designed Froude number of less than 0.25 and operating throughout a wide range of load or ballast conditions wherein the ballast waterline (BWL) are between 45% and 80% of the load waterline (LWL), the improvement comprising a protruding bulb portion of the bow of said vessel having a length (l) ahead of the forward perpendicular of said vessel, wherein the vessel length is (L) and a ratio of said length (l) over the maximum beam (b) of the bulb portion at the forward perpendicular of the vessel is in the range of about 0.5 to 2.5, and in which the measurements of said bulb portion comply with the equation $$\frac{l \times b^2}{B_s \times \frac{L_s}{20} \times \frac{d}{2}} = \text{Constant (C)}$$

in which the value of C is normally between 0.05 and [0.2] *0.30* with a preferred range between 0.07 and 0.18 and an optimum range between 0.09 and 0.13, and in which the area of the longitudinal midsection of said bulb forward of the forward perpendicular and above the Ballast Waterline is from one-sixth to one-third of the total area of the said midsection.

References Cited

The following references, cited by the Examiner, are of record in the patented file of this patent or the original patent.

UNITED STATES PATENTS

| | | | |
|---|---|---|---|
| 3,180,299 | 4/1965 | Inui | 114—56 |
| 3,306,243 | 2/1967 | Gray et al. | 114—56 |
| 3,433,194 | 3/1969 | Csupor | 114—56 |

OTHER REFERENCES

The Society of Naval Architects and Marine Engineers, 1962, vol. 70, pp. 282–353.

ANDREW H. FARRELL, Primary Examiner